United States Patent
Chang

(10) Patent No.: US 11,896,070 B2
(45) Date of Patent: Feb. 13, 2024

(54) METHOD OF COLLECTIVELY PREPARING CLOTHING HAVING MOISTURE PERMEABLE AND WATER PROOF PROPERTIES AND CLOTHING PREPARED USING THE METHOD

(71) Applicant: BRISTEX CO., LTD., Seoul (KR)

(72) Inventor: Keun Hun Chang, Seoul (KR)

(73) Assignee: BRISTEX CO., LTD., Seoul (KR)

( * ) Notice: Subject to any disclaimer, the term of this patent is extended or adjusted under 35 U.S.C. 154(b) by 147 days.

(21) Appl. No.: 17/476,970

(22) Filed: Sep. 16, 2021

(65) Prior Publication Data

US 2023/0067517 A1    Mar. 2, 2023

(30) Foreign Application Priority Data

Aug. 24, 2021    (KR) .......................... 10-2021-0111915

(51) Int. Cl.

| | | |
|---|---|---|
| *A41D 31/102* | (2019.01) | |
| *A41D 27/24* | (2006.01) | |
| *B32B 5/02* | (2006.01) | |
| *B32B 5/16* | (2006.01) | |
| *B32B 7/06* | (2019.01) | |
| *B32B 7/12* | (2006.01) | |
| *B32B 27/12* | (2006.01) | |
| *B32B 37/10* | (2006.01) | |
| *B32B 37/12* | (2006.01) | |

(52) U.S. Cl.
CPC ......... *A41D 31/102* (2019.02); *A41D 27/245* (2013.01); *B32B 5/026* (2013.01);
(Continued)

(58) Field of Classification Search
CPC ................ A41D 31/102; A41D 27/245; A41D 2500/10; A41D 2500/52; A41D 31/10;
(Continued)

(56) References Cited

U.S. PATENT DOCUMENTS 3,985,602 A * 10/1976 Stuart ................... B44C 1/1712
                                                                      428/29
4,685,984 A *  8/1987 Powers .................... D06Q 1/12
                                                                      156/240
(Continued)

FOREIGN PATENT DOCUMENTS

| KR | 20120140205 A | 12/2012 |
|---|---|---|
| KR | 20140135888 A | 11/2014 |

(Continued)

OTHER PUBLICATIONS

KR20180024722A Machine Translation of Description (EPO/Google) (Year: 2023).*

(Continued)

*Primary Examiner* — Cynthia L Schaller
(74) *Attorney, Agent, or Firm* — Panitch Schwarze Belisario & Nadel LLP

(57) ABSTRACT

Provided are a method of collectively preparing moisture-permeable waterproof clothing and clothing prepared thereby. The method includes a step of cutting a fabric substrate and a film into a plurality of pieces, wherein the plurality of pieces includes at least a first and second group, wherein the first group includes a first substrate and film, and the second group includes a second substrate and film; a step of forming a first laminate by processing the first group; a step of forming a second laminate by processing the second group; a step of forming a seam by connecting the first and second substrate; a step of covering a seam area with the second film and then covering the second film with the first film; and a step of finally laminating the first and the second laminate along with the seam.

14 Claims, 7 Drawing Sheets

(52) U.S. Cl.
CPC .................. *B32B 5/16* (2013.01); *B32B 7/06* (2013.01); *B32B 7/12* (2013.01); *B32B 27/12* (2013.01); *B32B 37/10* (2013.01); *B32B 37/1207* (2013.01); *A41D 2500/10* (2013.01); *A41D 2500/52* (2013.01); *B32B 2037/1215* (2013.01); *B32B 2307/7265* (2013.01); *B32B 2437/00* (2013.01)

(58) Field of Classification Search
CPC ...... A41D 2300/52; B32B 5/026; B32B 5/16; B32B 7/06; B32B 7/12; B32B 27/12; B32B 37/10; B32B 37/1207; B32B 2037/1215; B32B 2307/7265; B32B 2437/00; A41H 43/04
See application file for complete search history.

(56) References Cited

U.S. PATENT DOCUMENTS

| | | | |
|---|---|---|---|
| 10,189,231 B2 | 1/2019 | Blackford et al. | |
| 2012/0282425 A1* | 11/2012 | Gallagher | B29C 65/4815 428/351 |
| 2021/0093029 A1* | 4/2021 | Gallagher | B29C 65/72 |

FOREIGN PATENT DOCUMENTS

| | | | |
|---|---|---|---|
| KR | 101500681 B1 | | 3/2015 |
| KR | 20180024722 A | * | 3/2018 |
| KR | 20180124341 A | | 11/2018 |
| KR | 20200002272 A | * | 1/2020 |
| KR | 102249678 B1 | | 5/2021 |
| WO | 2009/048504 A2 | | 4/2009 |
| WO | 2015/057176 A1 | | 4/2015 |
| WO | 2018/183802 A1 | | 10/2018 |
| WO | WO2020091349 A1 | * | 5/2020 |
| WO | WO2020116976 A1 | * | 6/2020 |

OTHER PUBLICATIONS

WO2020091349A1 Machine Translation of Description (EPO/Google) (Year: 2023).*
WO2020116976A1 Machine Translation of Description (EPO/Google) (Year: 2023).*
KR20200002272A Machine Translation of Description (EPO/Google) (Year: 2023).*
The extended European Search Report dated Mar. 17, 2022, by the European Patent Office in corresponding European Patent Application No. 21196803.7-1017. (8 pages).

* cited by examiner

METHOD OF COLLECTIVELY PREPARING CLOTHING HAVING MOISTURE PERMEABLE AND WATER PROOF PROPERTIES AND CLOTHING PREPARED USING THE METHOD

CROSS-REFERENCE TO RELATED APPLICATION

This application is based on and claims priority under 35 U.S.C. § 119 to Korean Patent Application No. 10-2021-0111915, filed on Aug. 24, 2021, in the Korean Intellectual Property Office, the disclosure of which is incorporated by reference herein in its entirety.

BACKGROUND

1. Field

One or more embodiments relate to a method of collectively preparing moisture-permeable waterproof clothing and moisture-permeable waterproof clothing prepared using the method, and more particularly, to a method of collectively preparing moisture-permeable waterproof clothing, the method capable of providing moisture-permeable waterproof clothing not including a seam sealing tape and moisture-permeable waterproof clothing prepared using the method.

2. Description of the Related Art

In recent years, after the introduction of a 52-hour work week, leisure time has increased, and as the lifestyle that emphasizes a comfortable and relaxed life has become a trend, moisture-permeable waterproof clothing industries have posted high sales growth every year.

Additionally, ever since the pandemic caused by the spread of COVID-19 has started, outdoor activities that facilitate physical activity have increased due to restrictions on indoor activities, and thus accordingly expenditure on outdoor clothing has further increased.

In general, moisture-permeable waterproof fabrics refer to fabric materials that discharge sweat in the form of water vapor generated from the body to the outside and prevent water in a liquid state such as rainwater from seeping into the clothing from the outside. A water-repellent processing method is applied to such moisture-permeable waterproof fabrics so that water from the outside may not permeate a surface of the fabric. The moisture-permeable waterproof fabrics having these three important features, which are moisture-permeable, waterproof, and water-repellent functions are widely used in outdoor clothing for mountain climbing, skiing, golfing, cycling, and hiking or in sportswear and casual wear.

The related arts of the method of preparing a moisture-permeable waterproof fabric described above include a two-layered structure (two layers) in which a fiber layer and a membrane layer are already attached by an adhesive; and a three-layered structure (three layers) in which a fiber layer (outer fabric), a membrane layer, and a fiber layer (lining) are already attached by an adhesive.

Korean Patent Registration Notification No. 10-1500681 discloses a base fabric layer that is weaved or knitted with polyester yarn and then dyed, a two-layer moisture-permeable waterproof fabric having a moisture-permeable waterproof film of a polyurethane material on the base fabric layer, and a three-layer moisture-permeable waterproof fabric, in which a fiber fabric layer that is weaved or knitted with polyester yarn and then dyed is laminated on the moisture-permeable waterproof film layer of the two-layer moisture-permeable waterproof fabric, wherein interlayer binding durability of the three-layer moisture-permeable waterproof fabric is secured by room-temperature plasma treatment on at least one surface of the moisture-permeable waterproof film layer made of a polyurethane material or an adherend surface of the base fabric or fiber fabric that is attached to the moisture-permeable waterproof film layer.

Korean Public Patent Notification No. 10-2012-0140205 discloses a laminate capable of achieving light weight by securing adhesive strength between a waterproof film and a fabric, and a method of preparing the laminate. The laminate 1 is a laminate in which a waterproof film 4 is interposed between a first fabric 2 and a second fabric 3. The first fabric 2 is a fabric having a weight per unit area in a range of 3 g/m² to 30 g/m². In the fabric, warp and weft yarns are sealed by a resin A. The first fabric 2 and the waterproof film 4 are adhered by a dot-shaped resin A 5 and a dot-shaped resin B 6. The second fabric 3 and the waterproof film 4 are adhered by a resin C 8. As the resin A, a thermosetting resin or a thermoplastic resin having a melting point in a range of 80° C. to 160° C. is used, and as the resin B, a thermoplastic resin having a melting point that is 5° C. to 40° C. lower than that of the resin A is used.

Korean Public Patent Notification No. 10-2014-0135888 discloses a method of preparing a moisture-permeable waterproof fabric having improved adhesiveness, moisture permeability, and breathability by laminating a polyurethane-based synthetic resin on a fiber fabric having improved adhesive strength by modifying a surface of the fiber fabric using vacuum plasma.

The moisture-permeable waterproof fabrics of the related arts described above have a two-layered structure and a three-layered structure in which a film layer is already laminated with a fabric layer by an adhesive, and thus separation of layers is impossible since improved adhesive strength of the structures is secured. In this way, the moisture-permeable waterproof fabrics may only be used in manufacture of moisture-permeable waterproof clothing in a state in which the film layer is already combined with the fabric layer.

According to the methods of preparing moisture-permeable and waterproof clothing of the related arts, a moisture-permeable and waterproof fabric in a state in which two or three layers are already laminated by an adhesive is cut into each piece such as front, rear, side, arm, or hood according to the design of the clothing, and then the pieces are sewed using a sewing machine, thereby completing manufacture of the clothing. Here, during the sewing of the pieces, one fabric is sewed to another fabric using a sewing thread to complete a shape of the clothing. When the fabrics already laminated with the film layer are connected by stitching, rainwater from the outside flows into the moisture-permeable waterproof clothing through needle holes of the moisture-permeable waterproof film layer formed by the stitching, and thus the function as waterproof clothing is lost. Thus, in order to prevent this, moisture-permeable waterproof clothing of the related art finished the manufacture by attaching a seam sealing tape on seam portions sewn during the manufacture to provide a waterproofing property, and thus the waterproofing function of the clothing is maintained.

The seam sealing tape used in the finishing process is used according to a structure of a moisture-permeable waterproof fabric that has already been laminated, where a seam sealing tape of a two-layer structure formed of a waterproof film layer and an adhesive layer is used on sewn seam portions of a moisture-permeable fabric of a two-layered structure formed by lamination of a fabric layer and a film layer, and a seam sealing tape of a three-layer structure formed of a fabric layer (lining), a waterproof film layer, and an adhesive layer is used on sewn seam portions of a moisture-permeable fabric of a three-layered structure formed of a fabric layer (outer fabric), a waterproof film layer, and a fabric layer (lining).

The seam sealing tape manufactured according to each of the functional fabrics maintains a waterproof function at the seam portions by melting the adhesive layer with hot air in a seam sealing machine capable of performing taping treatment and then undergoing a sealing treatment process using a press roller.

Also, other types of methods of preparing moisture-permeable waterproof clothing of the related arts include Korean Public Patent Notification No. 10-2018-0124341, which discloses a method of finishing outdoor clothing having excellent tensile strength and waterproofness, the method including a step of first welding moisture-permeable waterproof fabrics in an overlapped state using an ultrasonic welding machine (S1); a step of cutting the first welded moisture-permeable waterproof fabrics and sewing a zipper to the fabrics (S2); a step of second welding an inner collar of the attached zipper and the moisture-permeable waterproof fabrics in an overlapped state using an ultrasonic welding machine (S3); a step of attaching and melting a polymer adhesive film on the bonding surface (S4); and a step of finishing an outer collar of the zipper portion and an end portion with a seam sealing tape (S5).

Korean Patent Registration Notification No. 10-2249678 provides waterproof fabrics that include a base fabric having a body-facing surface and an outward-facing surface, and a hydrophobic, waterproof barrier disposed on the outward-facing surface of the base fabric, a seam through the waterproof fabric, and a waterproof tape disposed on an outward-facing surface of the hydrophobic, waterproof barrier and aligned to seal the seam against water ingress. Also, the Patent Registration Notification discloses a method of preparing an article, wherein the waterproof barrier has an exposed outward-facing surface and an inward-inner surface facing the base material, the preparing of the article includes forming a seam between two or more pieces of the waterproof fabrics, and binding a waterproof tape on the outward-facing surface of the waterproof barrier, and the binding of the waterproof tape is aligning the waterproof tape to seal the seam against water ingress.

However, when a moisture-permeable waterproof fabric is finished using a seal sealing tape of the related art, a volume and a weight of the manufactured moisture-permeable waterproof clothing may increase, there may be limitation of the sewn portions becoming stiff, and the moisture permeating function of the moisture-permeable waterproof fabric may be significantly deteriorated due to the seam sealing tape attached on the seam portions of the clothing. Also, the seam sealing tape may be treated in the lining or the outside of the lining, which exposes the seam sealing tape, and thus neat finishing of the clothing may be difficult. Moreover, when a zipper or a pocket is sewn together with the moisture-permeable waterproof fabric, the deterioration of the moisture permeating function may further by increased, and the clothing may not be prepared in light weight. Also, during preparation of moisture-permeable waterproof clothing, a thickness of seam portions may increase according to the attachment of the seam sealing tape, which results in poor wearing comfort, and there may be many restrictions in the design of the moisture-permeable waterproof clothing.

These methods of the related arts include a structure in which a film layer is located at an inside (inside of a two-layered film), between fabrics (in a three-layered structure), or at an outside (outside of a two-layered film), and thus each of the method includes a step of preparing a laminated fabric in which a fabric is laminated on the moisture-permeable waterproof film layer by adhesion (first step); a step of forming a shape of clothing by cutting the moisture-permeable waterproof fabric and forming seams (by welding through sewing and using an ultrasonic welding machine) (second step); and a step of completing finish treatment of seam sealing taping for sealing the seams to complete waterproof clothing (third step). The first step is entirely completed by a moisture-permeable waterproof fabric manufacturer, and the second and third steps are entirely completed by a sewing factory.

Particularly, the sewing of the moisture-permeable and waterproof clothing is mainly made in Southeast Asia, and thus it may be said that the concentration on the region is high. In a pandemic situation such as COVID-19 these days, since lockdown measures are implemented by region, the damage increases in a production system with high locality, and thus it is difficult to form a stable supply chain through diversification of production.

SUMMARY

One or more embodiments include a method of collectively preparing moisture-permeable waterproof clothing, the method capable of providing moisture-permeable waterproof clothing that does not include a seam sealing tape.

One or more embodiments include moisture-permeable waterproof clothing prepared using the method of collectively preparing moisture-permeable waterproof.

Additional aspects will be set forth in part in the description which follows and, in part, will be apparent from the description, or may be learned by practice of the presented embodiments of the disclosure.

According to one or more embodiments, there is provided a method of collectively preparing moisture-permeable waterproof clothing, the method including a step of cutting a fabric substrate and a moisture-permeable waterproof film into a plurality of pieces according to an apparel design (S10), wherein the plurality of pieces are at least divided into a first piece group and a second piece group, wherein the first piece group includes a first fabric substrate and a first moisture-permeable waterproof film, and the second piece group includes a second fabric substrate and a second moisture-permeable waterproof film;

a step of forming a first laminate by processing the first piece group (S20), wherein the step of forming the first laminate includes a step of attaching a film-type adhesive having a predetermined width to one end of a first surface of the first moisture-permeable waterproof film in one direction (S20-1), a step of laminating a release paper having a predetermined width on one end of a first surface of the first fabric substrate in one direction (S20-2), a step of laminating the first moisture-permeable waterproof film on the first fabric substrate such that the first surface of the first moisture-permeable waterproof film and the first surface of the first fabric substrate face each other (S20-3), a step of partially and temporarily adhering the first moisture-permeable waterproof film and the first fabric substrate to each other by partial heat-pressing (S20-4), and a step of removing the releasing paper to form a first laminate (S20-5);

a step of forming a second laminate by processing the second piece group (S30), wherein the step of forming the second laminate includes a step of laminating the second moisture-permeable waterproof film on the second fabric substrate such that a first surface of the second moisture-permeable waterproof film and a first surface of the second fabric substrate face each other (S30-1) and a step of temporarily adhering the second moisture-permeable waterproof film and the second fabric substrate to each other by heat-pressing to form a second laminate (S30-2);

a step of forming a seam by arranging the first laminate and the second laminate such that the first fabric substrate of the first laminate and the second fabric substrate of the second laminate face each other and then connecting the first fabric substrate and the second fabric substrate (S40);

a step of covering an area of the seam with the second moisture-permeable waterproof film of the second laminate and then covering the second moisture-permeable waterproof film with the first moisture-permeable waterproof film of the first laminate (S50); and a step of finally laminating the first laminate and the second laminate along with the seam (S60).

The step S30 may further includes a step of laminating a release paper having a predetermined width on one end of the first surface of the second fabric substrate in one direction before the step S30-1, and the step S30-2 may be a step of forming the second laminate by temporarily adhering the second moisture-permeable waterproof film and the second fabric substrate to each other by heat-pressing and then removing the release paper.

The fabric substrate may be treated with a durable water repellent agent, wherein the fabric substrate is free of perfluorocarbons (PFCs), an initial water repellency of the fabric substrate measured according to AATCC 22 is 90% (grade 4) or higher, and a water repellency of the of the fabric substrate measured according to AATCC 22 after 10 times of washing is 80% (grade 3) or higher.

The moisture-permeable waterproof film may include a release layer, a membrane layer, a base dot layer, and a hot-melt dot adhesive layer that are sequentially laminated in the stated order.

A thickness of the membrane layer may be in a range of about 5 µm to about 100 µm, a basis weight of the hot-melt dot adhesive layer may be in a range of about 5 g/m$^2$ to about 20 g/m$^2$, and the base dot layer and the hot-melt dot adhesive layer may constitute a double-dot layer having a unit density in a range of about 30 dots/cm$^2$ to about 220 dots/cm$^2$ and a linear density in a range of about 13 dots/inch to about 45 dots/inch.

The membrane layer may include polyurethane, polyester, polyamide, polytetrafluoroethylene, or a combination thereof.

The moisture-permeable waterproof film may have a moisture-permeability measured according to JIS L 1099 B-1 in a range of about 3,000 g/m$^2$/24 hr to about 50,000 g/m$^2$/24 hr and a water pressure resistance measured according to JIS L 1092 B in a range of about 5,000 mmH$_2$O to about 20,000 mmH$_2$O.

The moisture-permeable waterproof film may include a knitted layer, an adhesive layer, a membrane layer, a base dot layer, and a hot-melt dot adhesive layer that are sequentially laminated in the stated order.

A basis weight of the knitted layer may be in a range of about 15 g/m$^2$ to about 45 g/m$^2$, a thickness of the membrane layer may be in a range of about 5 µm to about 100 µm, a basis weight of the hot-melt dot adhesive layer may be in a range of about 5 g/m$^2$ to about 20 g/m$^2$, and the base dot layer and the hot-melt dot adhesive layer may constitute a double dot layer having a unit density in a range of about 30 dots/cm$^2$ to about 220 dots/cm$^2$ and a linear density in a range of about 13 dots/inch to about 45 dots/inch.

The moisture-permeable waterproof film may have a moisture-permeability measured according to JIS L 1099 B-1 in a range of about 3,000 g/m$^2$/24 hr to about 50,000 g/m$^2$/24 hr and a water pressure resistance measured according to JIS L 1092 B in a range of about 5,000 mmH$_2$O to about 20,000 mmH$_2$O.

The film-type adhesive may include a release paper layer and an adhesive layer laminated on the release paper layer.

The partial heat-pressing in the step S20-3 may be performed using an iron or a roller type fusing machine.

The seam in the step S40 may be formed by stitching.

The finally laminating process in the step S60 may be performed by a permanent adhering method using a heat press machine.

According to one or more embodiments, moisture-permeable waterproof clothing is prepared using the method of collectively preparing moisture-permeable waterproof clothing, wherein the moisture-permeable waterproof clothing is free of a seam sealing tape.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
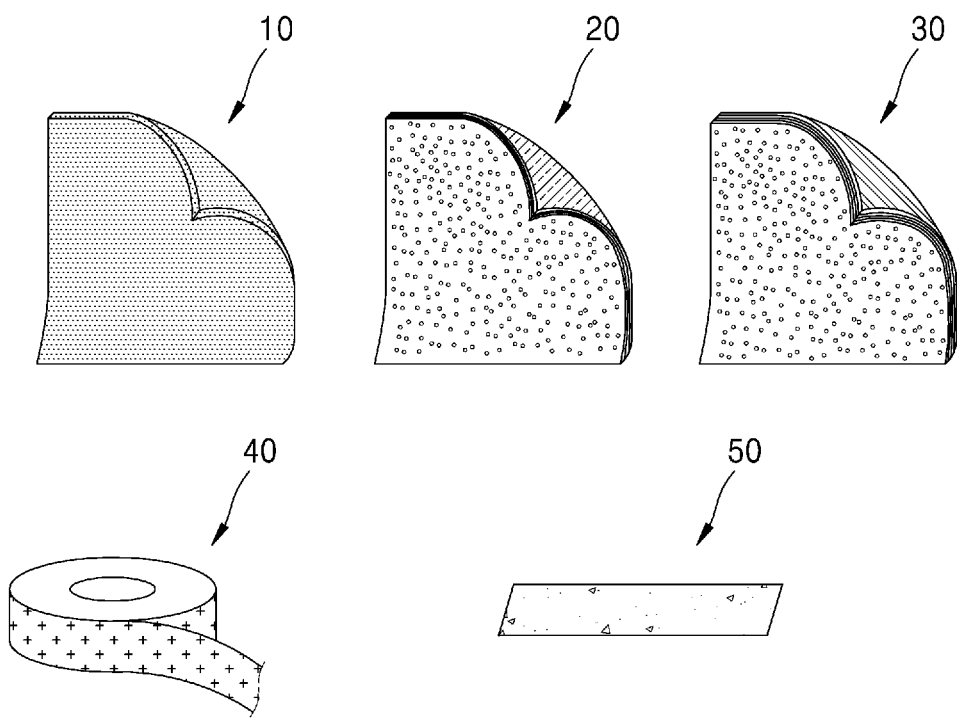
FIG. 1 schematically shows elements used in a method of collectively preparing moisture-permeable waterproof clothing according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a method of collectively preparing moisture-permeable waterproof clothing according to an embodiment will be described in detail with reference to the attached drawings.

As used herein, the term "one direction" denotes a direction parallel to a direction in which an end of one side of a moisture-permeable waterproof film is extended.

FIG. 1 schematically shows elements used in a method of collectively preparing moisture-permeable waterproof clothing according to an embodiment.

Referring to FIG. 1, the elements used in the method of collectively preparing moisture-permeable waterproof clothing according to an embodiment include a fabric substrate 10, moisture-permeable waterproof films 20 and 30, a film-type adhesive 40, and a release paper 50.

The fabric substrate 10 is treated with a durable water repellent agent, wherein the fabric substrate 10 is free of perfluorocarbons (PFCs), an initial water repellency of the fabric substrate 10 measured according to AATCC 22 is 90% (grade 4) or higher, and a water repellency of the of the fabric substrate 10 measured according to AATCC 22 after 10 times of washing is 80% (grade 3) or higher.

One selected from the moisture-permeable waterproof films 20 and 30 may be used

Also, the moisture-permeable waterproof films 20 and 30 may have a moisture-permeability measured according to JIS L 1099 B-1 in a range of about 3,000 $g/m^2/24$ hr to about 50,000 $g/m^2/24$ hr and a water pressure resistance measured according to JIS L 1092 B in a range of about 5,000 $mmH_2O$ to about 20,000 $mmH_2O$.

Figure 2:
FIG. 2 is a cross-sectional view of a fabric substrate and a release paper among the elements of FIG. 1.

FIG. 2 is a cross-sectional view of the fabric substrate 10 and the release paper 50 among the elements of FIG. 1. A thickness and a width of the fabric substrate 10 may be different from those of the release paper 50.

Figure 3:
FIG. 3 is a cross-sectional view of a moisture-permeable waterproof film among the elements of FIG. 1.

FIG. 3 is a cross-sectional view of the moisture-permeable waterproof film 20 among the elements of FIG. 1.

Referring to FIG. 3, the moisture-permeable waterproof film 20 may include a release layer 21, a membrane layer 22, a base dot layer 23, and a hot-melt dot adhesive layer 24 that are sequentially laminated in the stated order.

The base dot layer 23 and the hot-melt dot adhesive layer 24 may be referred to as a double dot layer 23+24.

In particular, the moisture-permeable waterproof film 20 may include the stable double dot layer 23+24 by transferring the base dot layer 23 onto a top of the moisture-permeable waterproof membrane layer 22, under which the release layer 21 is formed, and then heat-setting the hot-melt dot adhesive layer 24 on the base dot layer 23 and cooling the heat-set hot-melt dot adhesive layer 24.

Figure 4:
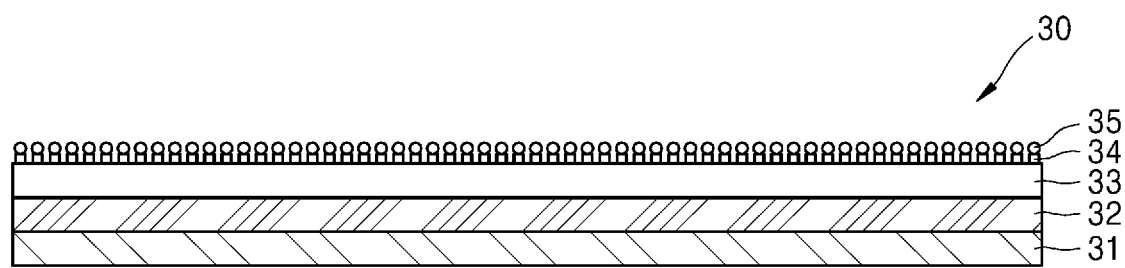
FIG. 4 is a cross-sectional view of another moisture-permeable waterproof film among the elements of FIG. 1.

FIG. 4 is a cross-sectional view of the moisture-permeable waterproof film 30 among the elements of FIG. 1.

Referring to FIG. 4, the moisture-permeable waterproof film 30 may include a knitted layer 31, an adhesive layer 32, a membrane layer 33, a base dot layer 34, and a hot-melt dot adhesive layer 35 that are sequentially laminated in the stated order.

As shown in FIG. 4, the moisture-permeable waterproof film 30 does not include the release layer 21 of the moisture-permeable waterproof film 20 shown in FIG. 3 but may further include the knitted layer 31 bonded on a lower part of the membrane layer 33. A method of bonding the knitted layer 31 may include a method of bonding by applying a solvent-type polyurethane adhesive to an entire surface of the knitted layer 31. Generally, when a polyurethane adhesive is dissolved in an organic solvent such as methyl ethyl ketone (MEK) or dimethylformamide (MDF) to form an adhesive layer, a surface of the adhesive layer is very smooth and has good friction resistance, which has many advantages such as elasticity, flexibility, bendability, and chemical resistance, and thus the adhesive layer may be widely used for various purposes such as coating of fabrics, paints, and other adhesive uses. However, embodiments are not limited thereto, and any other bonding method may be used. For example, as an intermittent coating method using a hot-melt adhesive, a method of applying the hot-melt adhesive in the form of dots or a mesh may be used.

When the knitted layer 31 is located on the lower part of the moisture-permeable waterproof membrane layer 33, lining is not needed to a fabric substrate used in manufacture of moisture-permeable waterproof clothing.

The knitted layer 31 may be knitted using vegetable fibers such as cotton and hemp; animal fibers such as silk and wool; synthetic fibers such as polyamide fibers, polyester fibers, acrylic fibers, rayon fibers, and polypropylene; or a combination thereof.

In particular, the knitted layer 31 may be prepared using nylon or polyester processed yarns, and a basis weight of the knitted layer 31 may be in a range of 15 $g/m^2$ to 45 $g/m^2$, for example, 16 $g/m^2$ to 35 $g/m^2$.

When the basis weight of the knitted layer 31 is greater than 45 $g/m^2$, a weight of the prepared moisture-permeable waterproof clothing may be heavy, which may result in insufficient flexibility of the clothing, and thus preparing the moisture-permeable waterproof clothing in a light weight may not be possible. Also, when the basis weight of the knitted layer 31 is less than 15 $g/m^2$, appearance of the prepared moisture-permeable waterproof clothing may be poor.

Particularly, the knitted layer 31 may be most preferably knitted into a warp knitted fabric or a circular knitted fabric, and the reason is because a knitted fabric having a texture of the warp knitted fabric or circular knitted fabric has excellent elasticity, flexibility, and drapability, which has an advantage of not forming wrinkles or puckers at the attached site.

Also, a method of preparing a knitted fabric may include a low gauge knitting loosely, a high gauge knitting tightly, and a middle gauge knitting intermediate of the low gauge and the high gauge. The gauge denotes the number of needles in 1 inch and is classified into a high gauge when the number of needles in 1 inch is 26 or higher and a low gauge when the number of needles in 1 inch is 20 or lower. The knitted layer 31 may be knitted in a range of 28 gauges to 42 gauges.

The base dot layer 34 and the hot-melt dot adhesive layer 35 may be collectively referred to as a double dot layer 34+35.

The membrane layer 22 or 33 of the moisture-permeable waterproof film 20 or 30 is thermally-bondable and may have a thickness in a range of 5 μm to 100 μm.

Also, a material of the membrane layer 22 or 33 may not be particularly limited, as long as the material has flexibility. For example, the membrane layer 22 or 23 may include polyurethane, polyester, polyethylene terephthalate, polybutylene terephthalate, polyamide, polytetrafluoroethylene, polyethylene, polypropylene, or a combination thereof. Particularly, polytetrafluoroethylene may uniformly form fine pores in a membrane which may thus exhibit excellent moisture permeability, polyurethane may form various membranes such as a membrane having pores and a membrane having a hydrophilic property, and polyethylene terephthalate and polybutylene terephthalate have excellent moisture permeability, waterproofness, tactile feel, and durability and thus may form a membrane having outstanding appearance. Also, polyamide has excellent corrosion resistance, abrasion resistance, chemical resistance, and insulating property and thus is widely used in preparation of a raw material of a moisture-permeable waterproof membrane.

The base dot layer 23 or 34 of the moisture-permeable waterproof film 20 or 30 may include an acryl-based resin, a polyurethane-based resin, a polyamide-based resin, a polyester-based resin, a polyolefin-based resin, a PVC resin, an EVA resin, or a combination thereof.

Also, the hot-melt dot adhesive layer 24 or 35 of the moisture-permeable waterproof film 20 or 30 may include a polyamide-based resin, a polyurethane-based resin, an EVA resin, a polyester-based resin, or a combination thereof.

A hot-melt adhesive that forms the hot-melt dot adhesive layer 24 or 35 refers to a heat-melting adhesive that is prepared by melting a nonvolatile and nonflammable thermoplastic resin in a solid phase at room temperature without using water or a solvent by applying heat to the resin, is applied in a liquid phase to a subject to be attached, and then exhibits adhesive strength as the adhesive cools and solidifies.

Figure 5:
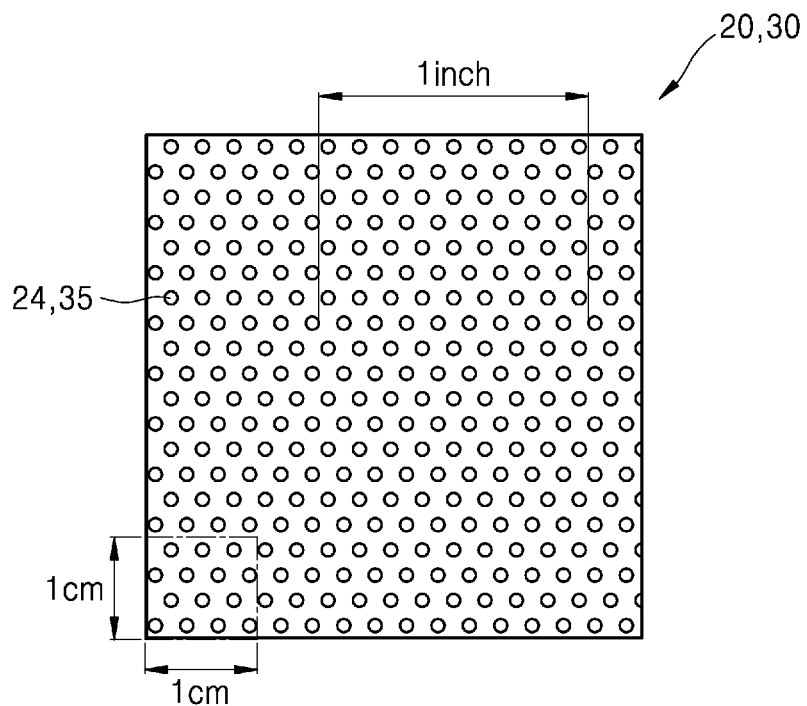
FIG. 5 is a plan view of a moisture-permeable waterproof film among the elements of FIG. 1.

FIG. 5 is a plan view of the moisture-permeable waterproof film 20 or 30 among the elements of FIG. 1. In particular, FIG. 5 is a plan view of the double dot layer 23+24 or 34+35 of the moisture-permeable waterproof film 20 or 30.

Referring to FIG. 5, a formation density of the double dot layer 23+24 or 34+35 may be represented by the number of dots of the double dot layer 23+24 or 34+35 formed in 1 cm$^2$ of a surface of the moisture-permeable waterproof film 20 or 30, i.e., a unit density. In this case, a unit density of the double dot layer 23+24 or 34+35 may be in arrange of 30 dots/cm$^2$ to 220 dots/cm$^2$.

Also, as shown in FIG. 5, the formation density of the double dot layer 23+24 or 34+35 may be represented by the number of dots of the double dot layer 23+24 or 34+35 formed in a line on a 1-inch long line, i.e., a linear density. In this case, a linear density of the double dot layer 23+24 or 34+35 may be in a range of 13 dots/inch to 45 dots/inch.

When the unit density and the linear density of the double dot layer 23+24 or 34+35 are within these ranges, a moisture permeability of the moisture-permeable waterproof film 20 or 30 measured according to JIS L 1099 B-1 may be maintained in a range of 3,000 g/m$^2$/24 h to 50,000 g/m$^2$/24 h, which does not result in significant deterioration of the moisture permeability, and thus the moisture-permeable waterproof film 20 or 30 may have an excellent moisture permeability.

Also, since the hot-melt dot adhesive layer 24 or 35 has excellent adhesive strength, peeling durability and abrasion durability of the moisture-permeable waterproof film 20 or 30 may be improved.

Figure 6:
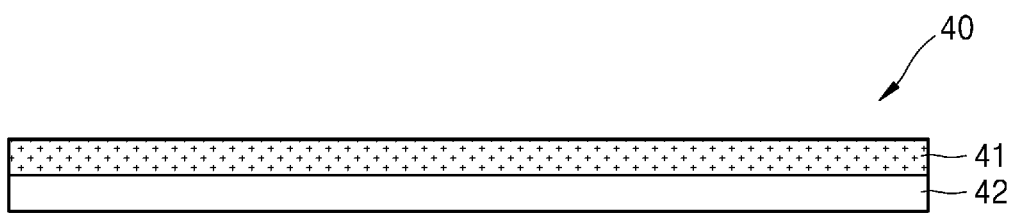
FIG. 6 is a cross-sectional view of a film-type adhesive among the elements of FIG. 1.

FIG. 6 is a cross-sectional view of the film-type adhesive 40 among the elements of FIG. 1.

Referring to FIG. 6, the film-type adhesive 40 includes a release paper layer 41; and an adhesive layer 42 laminated on the release paper layer 41.

The release paper layer 41 maintains a shape of the film-type adhesive 40.

The adhesive layer 42 may include polyurethane, polyester, polyamide, or a combination thereof having thermoplastic properties.

The film-type adhesive 40 may be in a shape of a tape having a thickness in a range of 25 μm to 150 μm and a width in a range of 3 mm to 15 mm.

In the case of a seam sealing tape of the related art, a usable width of the seam sealing tape has to be at least 20 mm to 22 mm to completely seal a sewn seam portion, but when the film-type adhesive 40 is used, a width of the film-type adhesive 40 may be in a range of 3 mm to 15 mm according to characteristics of a fabric substrate, and thus unique characteristics of the fabric may be maintained, and a weight of clothing may be reduced as much as possible. Particularly, in the case of preparing three-layered moisture-permeable waterproof clothing, effects of moisture permeability and elasticity along with reducing the weight of the clothing may be achieved to the maximum.

In case of using the seam sealing tape of the related art, performance as waterproof clothing is recognized when the seam sealed portion withstands a constant water pressure (3 psi: 2,000 mmH$_2$O water column) for 2 minutes based on the standard of waterproofness. Here, Structures of the seam sealing tape of the related art may be classified into two structures, where one of the structures is a two-layered seam sealing tape that is formed of a waterproof film layer and an adhesive layer, the two-layered seam sealing tape generally having a thickness in a range of 70 μm to 120 μm and a width in a range of 20 mm to 22 mm. The other structure is a three-layered seam sealing tape that is formed of a fabric layer, a waterproof film layer, and an adhesive layer, the three-layered seam sealing tape generally having a thickness in a range of 250 μm to 400 μm and a width in a range of 20 mm to 22 mm.

On the other hand, the film-type adhesive 40 that is needed to collectively prepare two-layered moisture-permeable waterproof fabric and clothing using the moisture-permeable waterproof film 20 is directly attached to the moisture-permeable waterproof film 20, and thus sufficient water pressure resistance may be achieved by using the film-type adhesive 40 having a thickness in a range of 25 μm to 60 μm. The film-type adhesive 40 that is need to collectively prepare three-layered moisture-permeable waterproof fabric and clothing using the moisture-permeable waterproof film 20 is attached to the membrane layer 33 through the knitted layer 31 of the moisture-permeable waterproof film 30, where the membrane layer 33 is located on a surface of the knitted layer 31 opposite to the film-type adhesive 40, and thus sufficient water pressure resistance may be achieved by using the film-type adhesive 40 having a thickness in a range of 70 μm to 150 μm.

Also, when clothing is prepared using the moisture-permeable waterproof film 20 or 30, an end portion of the moisture-permeable waterproof film 20 or 30 may be finished with the film-type adhesive 40 so that the end portion may withstand a constant water pressure of 3,000 mmH$_2$O water column or higher for 2 minutes. Since only one layer of the film-type adhesive 40 having a width in a range of 3 mm to 15 mm and a thickness in a range of 25 μm to 150 μm is used, the effect of reducing a weight of the clothing may be achieved. Also, the film-type adhesive 40 is not seen from the outside, and thus the clothing may have neat appearance, thereby completing manufacture of seam-sealing-tape free moisture-permeable waterproof clothing.

FIGS. 7 to 14 are schematic views for explaining steps of the method of collectively preparing moisture-permeable waterproof clothing according to an embodiment.

The method of collectively preparing moisture-permeable waterproof clothing according to an embodiment includes a step of cutting a fabric substrate and a moisture-permeable waterproof film into a plurality of pieces according to an apparel design (S10). Hereinafter, the moisture-permeable waterproof film 30 will be used as an example, but the moisture-permeable waterproof film 20 may also be used in the same manner as the moisture-permeable waterproof film 30 is used in the method of collectively preparing moisture-permeable waterproof clothing.

The plurality of pieces may be at least divided into a first piece group and a second piece group.

The first piece group may include a first fabric substrate 10 and a first moisture-permeable waterproof film 30.

Similarly, the second piece group may include a second fabric substrate 10' and a second moisture-permeable waterproof film 30'.

Figure 9:
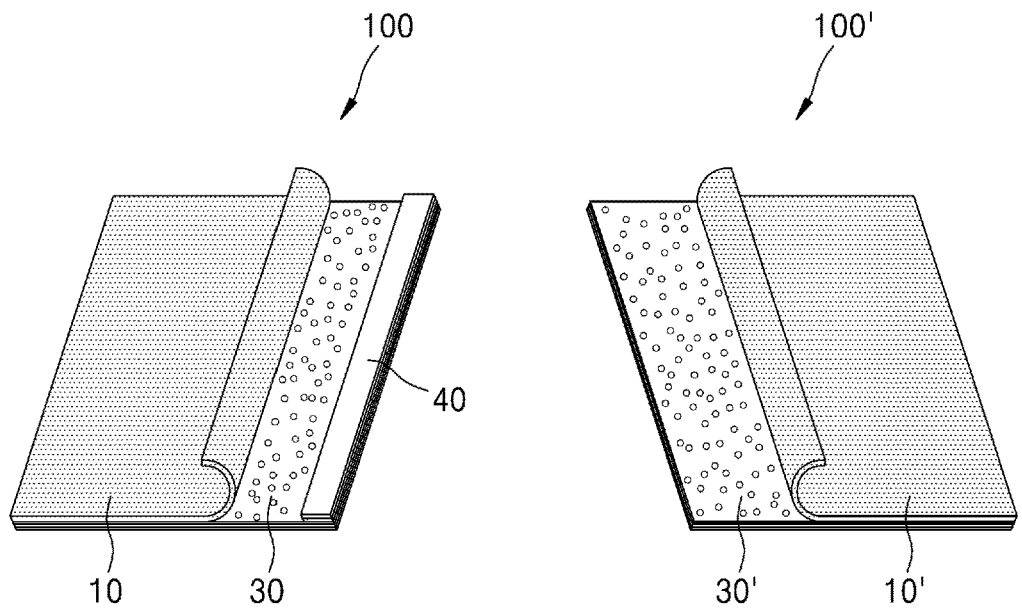

Next, the method of collectively preparing moisture-permeable waterproof clothing may include a step of forming a first laminate 100 of FIG. 9 by processing the first piece group (S20).

Figure 7:
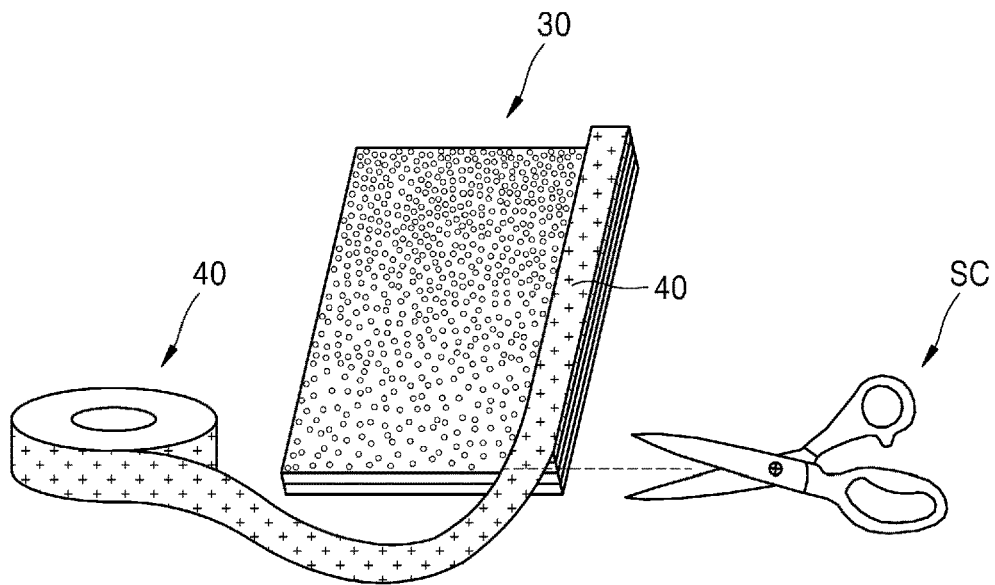
FIGS. 7 to 14 are schematic views for explaining steps of the method of collectively preparing moisture-permeable waterproof clothing according to an embodiment.

Referring to FIG. 7, the step of forming the first laminate S20 may include a step of attaching a film-type adhesive 40 having a predetermined width to one end of a first surface (i.e., an upper surface or a lower surface) of the first moisture-permeable waterproof film 30 in one direction (S20-1), In particular, the film-type adhesive 40 wound in the form of a roll may be cut using scissors SC according to a width or length of the first moisture-permeable waterproof film 30 and attached on the one end of the first surface of the first moisture-permeable waterproof film 30.

Figure 8:
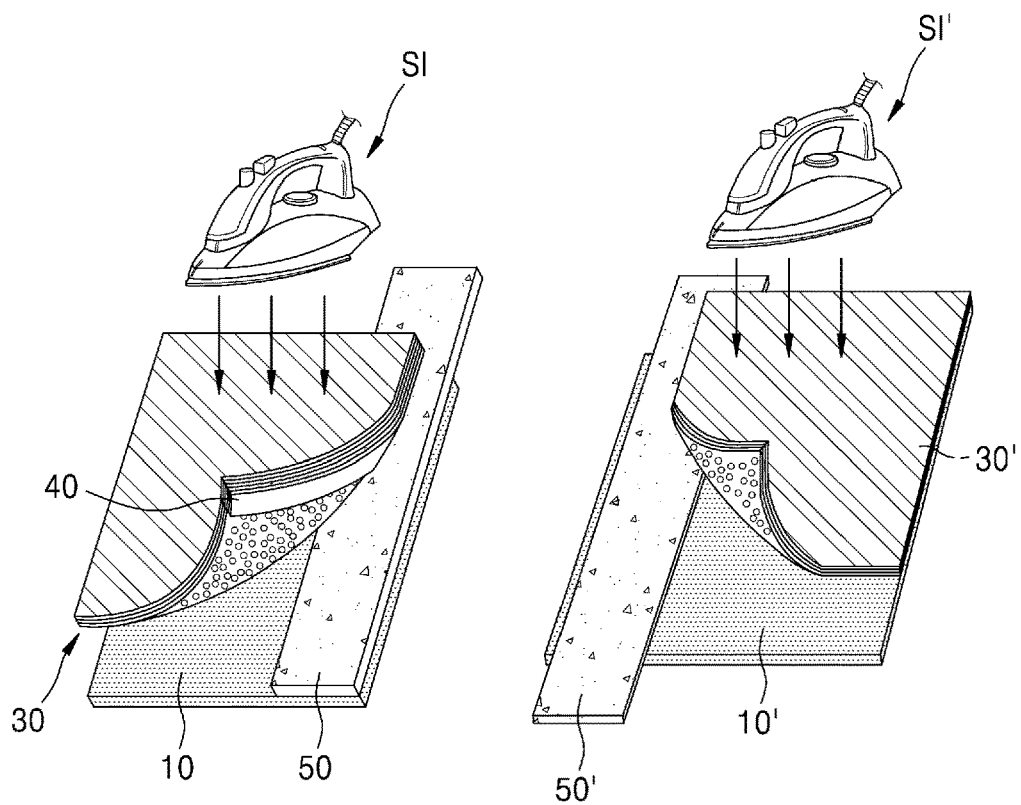

Also, referring to FIG. 8, the step of forming the first laminate S20 may further include a step of laminating a release paper 50 having a predetermined width on one end of a first surface (i.e., an upper surface or a lower surface) of the first fabric substrate 10 in one direction (S20-2). The release paper 50 prevents the first fabric substrate 10 and the first moisture-permeable waterproof film 30 from temporarily adhering by at least a width of the release paper 50 in a partially and temporarily adhering step S20-3 that will be described later. Alternatively, when the release paper 50 is laminated on the first surface (i.e., a surface on which the film-type adhesive 40 is attached) of the first moisture-permeable waterproof film 30 instead of on the first surface of the first fabric substrate 10, the same effect of laminating the release paper 50 on the first surface of the first fabric substrate 10 may be obtained.

Also, referring to FIG. 8, the step of forming the first laminate S20 may further include a step of laminating the first moisture-permeable waterproof film 30 on the first fabric substrate 10 such that the first surface of the first moisture-permeable waterproof film 30 and the first surface of the first fabric substrate 10 face each other (i.e., the film-type adhesive 40 is disposed between the first fabric substrate 10 and the first moisture-permeable waterproof film 30) (S20-3).

Also, referring to FIG. 8, the step of forming the first laminate S20 may further include a step of partially and temporarily adhering the first moisture-permeable waterproof film 30 and the first fabric substrate 10 to each other by partial heat-pressing (S20-4). The partial and temporary adhering process is to fix a coupling position of the first moisture-permeable waterproof film 30 and the first fabric substrate 10 before performing a final laminating process of a step S60, which will be described later. In the step S20-3, the partial heat-pressing process may be performed using an iron (e.g., steam iron) SI or a roller type fusing machine.

Also, the step of forming the first laminate S20 may further include a step of removing the releasing paper 50 to form a first laminate (S20-5) after the step S20-4.

As a result, as shown in FIG. 9, a first laminate 100 including the first fabric substrate 10; the first moisture-permeable waterproof film 30 that is partially and temporarily adhered to one surface of the first fabric substrate 10; and the film-type adhesive 40 attached to one end of the first moisture-permeable waterproof film 30 may be obtained.

Also, the method of collectively preparing moisture-permeable waterproof clothing may include a step of forming a second laminate 100' of FIG. 9 by processing the second piece group (S30).

The step of forming the second laminate S30 may include a step of laminating the second moisture-permeable waterproof film on the second fabric substrate 10' such that a first surface (i.e., an upper surface or a lower surface) of the second moisture-permeable waterproof film 30' and a first surface of the second fabric substrate 10' face each other (S30-1). In the step of forming the second laminate S30, unlike in the step of forming the first laminate S20, the film-type adhesive 40 is not attached onto the second moisture-permeable waterproof film 30'.

Also, the step S30 may further include a step of laminating a release paper 50' of a predetermined width on one end of the first surface of the second fabric substrate 10' in one direction before the step S30-1, as shown on the right side of FIG. 8 (S30-0). The release paper 50' prevents the second fabric substrate 10' and the second moisture-permeable waterproof film 30' from temporarily adhering by at least a width of the release paper 50' in a temporarily adhering step S30-2 that will be described later. Alternatively, when the release paper 50' is laminated on the first surface of the second moisture-permeable waterproof film 30' instead of on the first surface of the second fabric substrate 10', the same effect of laminating the release paper 50' on the first surface of the second fabric substrate 10' may be obtained.

Also, the step of forming the second laminate S30 may further include a step of temporarily adhering the second moisture-permeable waterproof film 30' and the second fabric substrate 10' to each other by heat-pressing to form a second laminate 100' (S30-2). The temporary adhering process is to fix a coupling position of the second moisture-permeable waterproof film 30' and the second fabric substrate 10' before performing a final laminating process of a step S60, which will be described later. In the step S30-2, the heat-pressing process may be performed using an iron SI or a roller type fusing machine. In particular, the heat-pressing process may be performed on whole or a portion of the second moisture-permeable waterproof film 30' and the second fabric substrate 10'. More particularly, when the step of forming the second laminate S30 does not include the step of laminating the release paper S30-0, the heat-pressing process may be performed on whole portion of the second moisture-permeable waterproof film 30' and the second fabric substrate 10' (see FIG. 13). On the other hand, when the step of forming the second laminate S30 includes the step of laminating the release paper S30-0, the heat-pressing process may be performed on a portion of the second moisture-permeable waterproof film 30' and the second fabric substrate 10' (see FIG. 9).

Also, when the step S30 further includes the laminating the release paper 50' S30-0 on the second fabric substrate 10' before the step S30-1, the step S30-2 may be a step of forming a second laminate 100' by temporarily adhering the second moisture-permeable waterproof film 30' and the second fabric substrate 10' to each other through heat-pressing, and then removing the release paper 50'.

As a result, as shown in FIG. 9, a second laminate 100' including the second fabric substrate 10' and the second moisture-permeable waterproof substrate 30' that is partially and temporarily adhered to one surface of the second fabric substrate 10' may be obtained.

Figure 10:
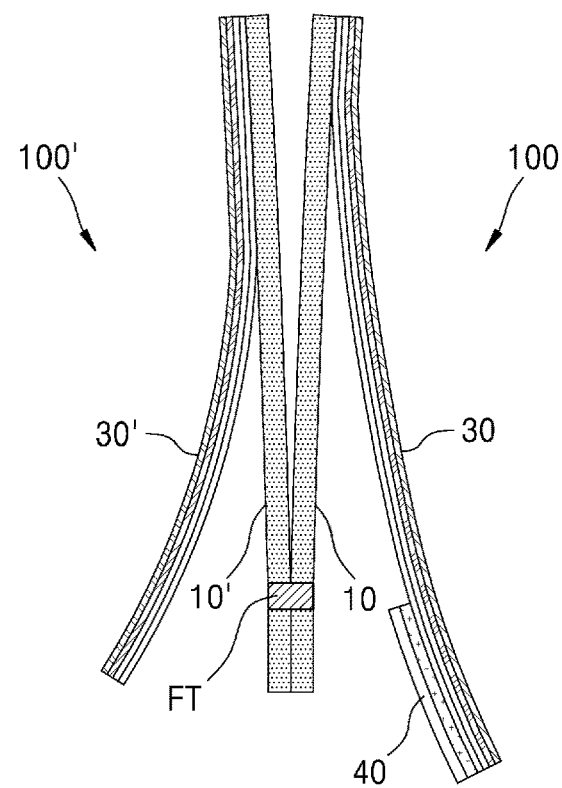

Also, referring to FIG. 10, the method of collectively preparing moisture-permeable waterproof clothing may further include a step of forming a seam FT by arranging the first laminate 100 and the second laminate 100' such that the first fabric substrate 10 and the second fabric substrate 10' face each other and then connecting the first fabric substrate 10 and the second fabric substrate 10' (S40). Here, the seam FT may be formed by stitching.

Figure 11:
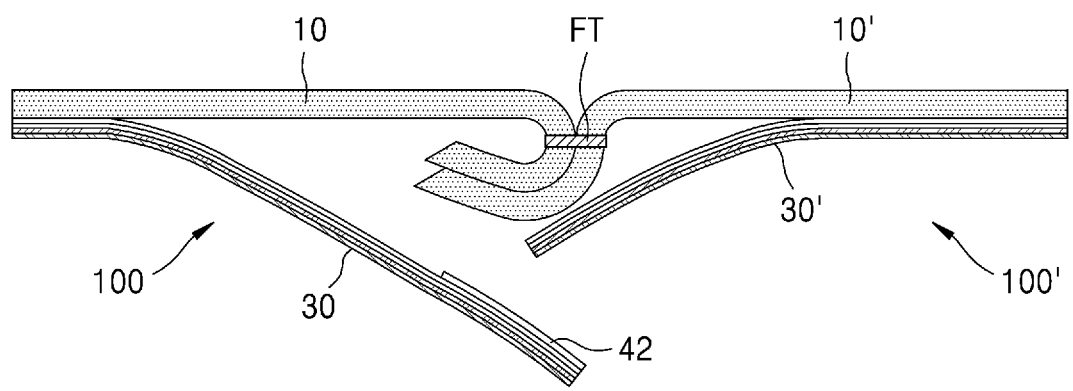

Also, referring to FIG. 11, the method of collectively preparing moisture-permeable waterproof clothing may further include a step of covering an area of the seam FT with the second moisture-permeable waterproof film 30' of the second laminate 100' and then covering the second moisture-permeable waterproof film 30' with the first moisture-permeable waterproof film 30 of the first laminate 100 (S50).

Also, although not shown in the drawing, the method of collectively preparing moisture-permeable waterproof clothing may further include a step of removing the release paper layer 41 from the film-type adhesive 40 attached on the first moisture-permeable waterproof film 30.

Figure 12:
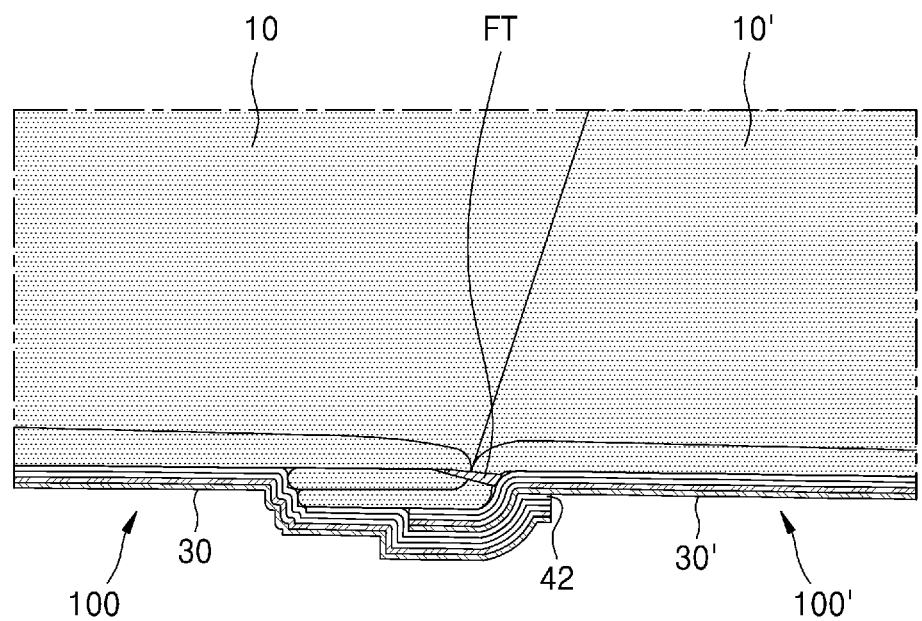

Referring to FIG. 12, the method of collectively preparing moisture-permeable waterproof clothing may further include a step of finally laminating the first laminate 100 and the second laminate 100' along with the seam FT (S60). In particular, the final laminating process may be performed by a permanent adhering method using a heat press machine. The conditions for permanent adhesion may vary depending on a material of the fabric substrate 10 or 10', but, in general, the permanent adhering process may be performed at a temperature in a range of 120° C. to 170° C. and a pressure in a range of 0.3 MPa to 0.5 MPa for 5 seconds to 20 seconds.

Figure 13:
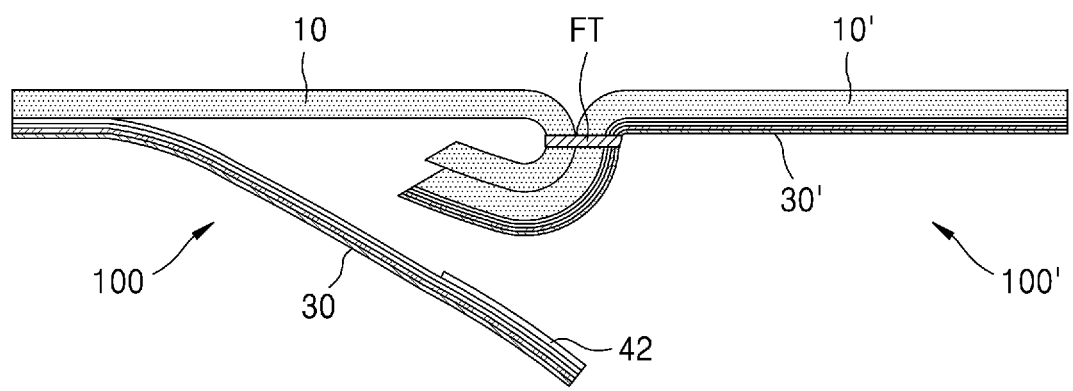

In contrast with FIG. 11, FIG. 13 shows the case when the step of forming the second laminate S30 does not include the step of laminating the release layer S30-0, where whole portion of the second moisture-permeable waterproof film 30' and the second fabric substrate 10' are heat-pressed and thus are temporarily adhered.

Figure 14:
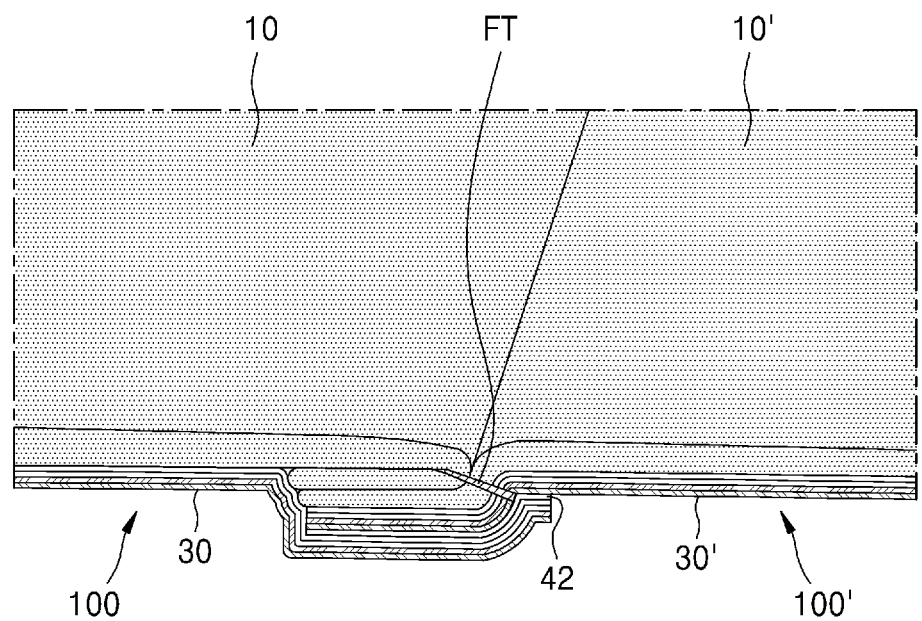

In contrast with FIG. 12, FIG. 14 shows the result of the final laminating process performed on the first and second laminates 100 and 100' of FIG. 13.

As described above, according to an aspect of an embodiment, a method of collectively preparing moisture-permeable waterproof clothing may prepare a fabric having a moisture-permeable waterproof function through a process of laminating a moisture-permeable waterproof film 20 or 30 on a fabric substrate 10 for preparing clothing by applying heat and pressure during a stitching process, and at the same time the method may be directly connected to preparation of moisture-permeable waterproof clothing, which may finally reduce steps of preparing clothing, thereby providing effect of enhancing the price competitiveness of the final product and shortening the production period. Also, the method may increase the design completeness of moisture-permeable waterproof clothing.

According to another aspect of an embodiment, moisture-permeable waterproof clothing is provided using the method of collectively preparing moisture-permeable waterproof clothing, and the moisture-permeable waterproof clothing does not include a seam sealing tape.

The method according to an embodiment of the present invention is a method that simultaneously realizes preparation of a moisture-permeable waterproof fabric and preparation of moisture-permeable waterproof clothing in a preparation process of moisture-permeable waterproof clothing, wherein clothing having a perfect waterproof function may be manufactured without using a separate seam sealing tape.

Also, a moisture-permeable waterproof film capable of thermal bonding with various functions (high moisture permeability, high water pressure resistance, or breathability) while preventing shading of each cut portion of an outer fabric may be applied to a fabric produced in the same dye lot, and thus optimum moisture-permeable waterproof clothing that meets the need of each body part according to the body map may be manufactured.

In particular, regardless of small-volume production or mass production, the difficulty of a seam sealing task that is professionalized and highly localized may be decreased by reducing the preparation process of moisture-permeable waterproof clothing by using only an iron and a heat press machine without localization, and custom-made moisture-permeable and waterproof clothing for various physical conditions may be manufactured.

In the case of a heat-bondable moisture-permeable waterproof film, color matching is not required, and thus a certain amount of production may be secured in advance, and a fabric only needs to undergo dye treatment and water-repellent process treatment, which may result in a decrease of a period of time for production of a heat-bondable moisture-permeable waterproof fabric than that of a conventional moisture-permeable waterproof fabric production process.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of collectively preparing moisture-permeable waterproof clothing, the method comprising:
a step of cutting a fabric substrate and a moisture-permeable waterproof film into a plurality of pieces according to an apparel design, wherein the plurality of pieces are at least divided into a first piece group and a second piece group, wherein the first piece group comprises a first fabric substrate and a first moisture-permeable waterproof film, and the second piece group comprises a second fabric substrate and a second moisture-permeable waterproof film;
a step of forming a first laminate by processing the first piece group, wherein the step of forming the first laminate comprises a step of attaching a film-type adhesive having a predetermined width to one end of a first surface of the first moisture-permeable waterproof film, a step of laminating a release paper having a predetermined width on one end of a first surface of the first fabric substrate, a step of laminating the first moisture-permeable waterproof film on the first fabric substrate such that the first surface of the first moisture-permeable waterproof film and the first surface of the first fabric substrate face each other, a step of partially and temporarily adhering the first moisture-permeable waterproof film and the first fabric substrate to each other by partial heat-pressing without an adhesive, and a step of removing the release paper to form a first laminate, wherein the release paper prevents the first fabric substrate and the first moisture-permeable waterproof film from temporarily adhering by at least a width of the release paper in the step;

a step of forming a second laminate by processing the second piece group, wherein the step of forming the second laminate comprises a step of laminating the second moisture-permeable waterproof film on the second fabric substrate such that a first surface of the second moisture-permeable waterproof film and a first surface of the second fabric substrate face each other and a step of temporarily adhering the second moisture-permeable waterproof film and the second fabric substrate to each other by heat-pressing without an adhesive to form a second laminate;

a step of forming a seam by arranging the first laminate and the second laminate such that the first fabric substrate of the first laminate and the second fabric substrate of the second laminate face each other and then connecting the first fabric substrate and the second fabric substrate;

a step of covering an area of the seam with the second moisture-permeable waterproof film of the second laminate and then covering the second moisture-permeable waterproof film with the first moisture-permeable waterproof film of the first laminate; and a step of finally laminating the first laminate and the second laminate along with the seam, wherein (1) the step of forming a second laminate further comprises a step of laminating a release paper having a predetermined width on one end of the first surface of the second fabric substrate before the step of laminating the second moisture-permeable waterproof film on the second fabric substrate, and (2) the step of temporarily adhering the second moisture-permeable waterproof film and the second fabric substrate to each other is a step of forming the second laminate by temporarily adhering the second moisture-permeable waterproof film and the second fabric substrate to each other by heat-pressing and then removing the release paper, and wherein in the step of forming the second laminate, unlike in the step of forming the first laminate, the film-type adhesive is not attached onto the second moisture-permeable waterproof film.

2. The method of claim 1, wherein the fabric substrate is treated with a durable water repellent agent, wherein the fabric substrate is free of perfluorocarbons (PFCs), an initial water repellency of the fabric substrate measured according to AATCC 22 is 90% (grade 4) or higher, and a water repellency of the of the fabric substrate measured according to AATCC 22 after 10 times of washing is 80% (grade 3) or higher.

3. The method of claim 1, wherein the moisture-permeable waterproof film comprises a release layer, a membrane layer, a base dot layer, and a hot-melt dot adhesive layer that are sequentially laminated in this order.

4. The method of claim 3, wherein a thickness of the membrane layer is in a range of about 5 µm to about 100 µm, a basis weight of the hot-melt dot adhesive layer is in a range of about 5 g/m² to about 20 g/m², and the base dot layer and the hot-melt dot adhesive layer constitute a double-dot layer having a unit density in a range of about 30 dots/cm² to about 220 dots/cm² and a linear density in a range of about 13 dots/inch to about 45 dots/inch.

5. The method of claim 3, wherein the membrane layer comprises polyurethane, polyester, polyamide, polytetrafluoroethylene, or a combination thereof.

6. The method of claim 3, wherein the moisture-permeable waterproof film has a moisture-permeability measured according to JIS L 1099 B-1 in a range of about 3,000 g/m²/24 hr to about 50,000 g/m²/24 hr and a water pressure resistance measured according to JIS L 1092 B in a range of about 5,000 mmH₂O to about 20,000 mmH₂O.

7. The method of claim 1, wherein the moisture-permeable waterproof film comprises a knitted layer, an adhesive layer, a membrane layer, a base dot layer, and a hot-melt dot adhesive layer that are sequentially laminated in this order.

8. The method of claim 7, wherein a basis weight of the knitted layer is in a range of about 15 g/m² to about 45 g/m², a thickness of the membrane layer is in a range of about 5 µm to about 100 µm, a basis weight of the hot-melt dot adhesive layer is in a range of about 5 g/m² to about 20 g/m², and the base dot layer and the hot-melt dot adhesive layer constitute a double dot layer having a unit density in a range of about 30 dots/cm² to about 220 dots/cm² and a linear density in a range of about 13 dots/inch to about 45 dots/inch.

9. The method of claim 7, wherein the moisture-permeable waterproof film has a moisture-permeability measured according to JIS L 1099 B-1 in a range of about 3,000 g/m²/24 hr to about 50,000 g/m²/24 hr and a water pressure resistance measured according to JIS L 1092 B in a range of about 5,000 mmH₂O to about 20,000 mmH₂O.

10. The method of claim 1, wherein the film-type adhesive comprises a release paper layer and an adhesive layer laminated on the release paper layer.

11. The method of claim 1, wherein the partial heat-pressing in the step of temporarily adhering the second moisture-permeable waterproof film and the second fabric substrate to each is performed using an iron or a roller type fusing machine.

12. The method of claim 1, wherein the seam in the step of forming a seam by arranging the first laminate and the second laminate are formed by stitching.

13. The method of claim 1, wherein the finally laminating process in the step of finally laminating the first laminate and the second laminate along with the seam is performed by a permanent adhering method using a heat press machine.

14. A moisture-permeable waterproof clothing prepared using the method of claim 1, wherein the clothing is free of a separate seam sealing tape other than the film-type adhesive.

* * * * *